(12) United States Patent
Kang (10) Patent No.: US 9,940,618 B2
(45) Date of Patent: Apr. 10, 2018

(54) METHOD AND APPARATUS FOR TRANSMITTING WALLETS BETWEEN MOBILE DEVICES

(71) Applicant: Samsung Electronics Co., Ltd., Gyeonggi-do (KR)

(72) Inventor: Bogyeong Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 299 days.

(21) Appl. No.: 14/315,980

(22) Filed: Jun. 26, 2014

(65) Prior Publication Data
US 2015/0006377 A1 Jan. 1, 2015

(30) Foreign Application Priority Data

Jun. 26, 2013 (KR) .................. 10-2013-0073748

(51) Int. Cl.
*G06Q 20/00* (2012.01)
*G06Q 20/32* (2012.01)
*G06Q 20/36* (2012.01)
*G07F 7/10* (2006.01)

(52) U.S. Cl.
CPC ........... *G06Q 20/36* (2013.01); *G06Q 20/322* (2013.01); *G06Q 20/3672* (2013.01)

(58) Field of Classification Search
CPC ........ G06Q 20/00; G06Q 20/32; G06Q 20/36; G06Q 20/202; G07F 7/10; H04L 63/067
USPC .......................................................... 705/41
See application file for complete search history.

(56) References Cited

U.S. PATENT DOCUMENTS

| 2010/0088188 | A1 | 4/2010 | Kumar et al. | |
|---|---|---|---|---|
| 2012/0172026 | A1* | 7/2012 | Kwon | H04L 63/067 455/419 |
| 2013/0132219 | A1* | 5/2013 | Liberty | G06Q 20/202 705/21 |

FOREIGN PATENT DOCUMENTS

| EP | 2610799 | * 12/2011 | ............. G06Q 20/32 |
|---|---|---|---|
| WO | WO 2012/091349 | 7/2012 | |

OTHER PUBLICATIONS

European Search Report dated Nov. 19, 2014 issued in counterpart application No. 14173844.3-1955.

* cited by examiner

*Primary Examiner* — Clifford Madamba
(74) *Attorney, Agent, or Firm* — The Farrell Law Firm, P.C.

(57) ABSTRACT

A method of and apparatus for transmitting data of a terminal which includes a wallet application used for a commercial transaction service is provided. The method includes determining wallet data which comprise payment information and non-payment information provided by the wallet application, which is able to be transmitted, and a scheme of transmitting the wallet data; notifying a receiving terminal of a transmission of the wallet data according to input transmission information; transmitting the wallet data to the receiving terminal based on the transmission method, after receiving an acceptance message from the receiving terminal; and updating information of the wallet data, which is transmitted to the receiving terminal, based on preset regulation information. The apparatus includes a wallet transmission and reception unit and a wallet management unit.

16 Claims, 6 Drawing Sheets

METHOD AND APPARATUS FOR TRANSMITTING WALLETS BETWEEN MOBILE DEVICES

PRIORITY

This application claims priority under 35 U.S.C. § 119(a) to a Korean Patent Application filed on Jun. 26, 2013 in the Korean Intellectual Property Office and assigned Serial No. 10-2013-0073748, the entire content of which is incorporated herein by reference.

BACKGROUND

1. Field of the Invention

The present invention generally relates to a method and an apparatus for transmitting wallets between mobile devices, and more particularly, to a method and an apparatus for transmitting payment and non-payment information, which are provided through various wallet applications, from one mobile device to another mobile device.

2. Description of the Related Art

With the popularity of mobile devices, such as a smart phone, which carry out data communication, the needs of mobile device users who want to introduce various kinds of information into a mobile device are gradually increasing. In order to satisfy one of the needs of the mobile device users, a plurality of mobile electronic wallets (hereinafter, referred to as "wallets" or "wallet applications") are provided and used, in which membership cards, coupons, tickets, and mileages, as well as credit cards which are a payment means used in a commercial transaction online and offline, are allowed to be used in a mobile device not in a real form but in data form.

The wallets are provided in the application form on the mobile device. A provider of a wallet application may invite member stores which provide a mobile wallet service through a wallet, and the member stores may provide information on a membership, a coupon, mileage, and the like, which are related to services provided thereby, through the wallet to a user of the mobile device. Further, a credit card company may provide payment information in the form of a mobile credit card to a user through a contract with a wallet application provider. The user may use the wallet application in the member store to pay for goods by means of the mobile credit card.

However, the serviced wallets are made based on different formats from one another, and they cannot share data therebetween. Each member store must provide a service through different wallet applications due to competition for securing member stores between wallet providers. Accordingly, the user of the mobile device is required to install plural wallet applications and use a different wallet application in each member store.

Especially, in a case that wallet data such as a coupon stored in the mobile device is intended to be transmitted to another mobile device, a wallet application capable of providing the corresponding wallet data is required to be installed in a mobile device of a reception side. Therefore, even though a user of the mobile device already uses a wallet application, there is inconvenience in that a new wallet application is required to be installed and managed in order to receive and use wallet data from another mobile device.

SUMMARY OF THE INVENTION

The present invention has been made to address the above-mentioned problems and disadvantages, and to provide at least the advantages described below. Accordingly, an aspect of the present invention is to provide a method of transmitting data between mobile devices which use different wallet applications respectively, so as to improve convenience of a user of the mobile device.

In accordance with an aspect of the present invention, there is provided a method of transmitting data of a terminal which includes a wallet application used for a commercial transaction service. The method includes determining wallet data which include payment information and non-payment information provided by the wallet application, which is able to be transmitted, and a scheme of transmitting the wallet data; notifying the receiving terminal of a transmission of the wallet data according to input transmission information; transmitting the wallet data to the receiving terminal based on the transmission method, when receiving an acceptance message from the receiving terminal; and updating information of the wallet data, which is transmitted to the receiving terminal, based on preset regulation information.

In accordance with another aspect of the present invention, there is provided a method of transmitting data of a wallet application used for a commercial transaction service using a mobile device. The method includes receiving a request of a transmission, which includes wallet data which include payment information and non-payment information provided by the wallet application, which is able to be transmitted to a receiving terminal; determining whether the transmission of the wallet data is permitted based on the request of the transmission; notifying the receiving terminal of the wallet data, when the transmission of the wallet data is permitted; transmitting the wallet data to the receiving terminal, after receiving an acceptance message from the receiving terminal; and requesting the transmitting terminal to update information according to the transmission of the wallet data based on preset regulation information. In accordance with another aspect of the present invention, there is provided a method of receiving data of a terminal which includes a wallet application used for a commercial transaction service. The method includes receiving a notification of a transmission of wallet data including payment information and non-payment information provided by the wallet application; transmitting an acceptance message corresponding to the notification of the transmission when the reception of the wallet data is permitted; and combining the wallet data with one combining application according to preset regulation information and providing the combined wallet data, after receiving the wallet data.

In accordance with another aspect of the present invention, there is provided an apparatus for transmitting wallet data on a wallet application used for a commercial transaction service. The apparatus includes a wallet transmission and reception unit which determines wallet data which include payment information and non-payment information provided by the wallet application and a scheme of transmitting the wallet data, notifies transmission of the wallet data to a receiving terminal according to input transmission information, and transmits the wallet data to the receiving terminal based on the transmission scheme after it receives an acceptance message from the receiving terminal; and a wallet management unit which updates information of the wallet data, which is transmitted to the receiving terminal, based on preset regulation information.

In accordance with another aspect of the present invention, there is provided an apparatus for transmitting wallet data on a wallet application used for a commercial transaction service. The apparatus includes a processor configured to receive a request of a transmission of wallet data, which include payment information and non-payment information provided by the wallet application, from a transmitting terminal, determine whether a transmission of the wallet data is permitted based on the request of the transmission, notify the receiving terminal of the transmission of the wallet data when the transmission of the wallet data is permitted, transmit the wallet data to the receiving terminal after receiving an acceptance message from the receiving terminal, and request the transmitting terminal to update information according to the transmission of the wallet data, based on preset regulation information.

In accordance with another aspect of the present invention, there is provided an apparatus of receiving data of a wallet application used for a commercial transaction service using a mobile device. The apparatus includes a wallet transmission and reception unit which receives a notification of a transmission of wallet data including payment information and non-payment information provided by the wallet application, transmits an acceptance message corresponding to the notification of the transmission when a reception of the wallet data is permitted, and receives the wallet data; and a wallet management unit which combines the wallet data with one combining application according to preset regulation information and provides the combined wallet data, after receiving the wallet data.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF THE EMBODIMENTS OF THE PRESENT INVENTION

Hereinafter, embodiments of the present invention are described with reference to the accompanying drawings. It should be noted that the same elements will be designated by the same reference numerals although they are shown in different drawings. Further, detailed descriptions related to well-known functions or configurations capable of making the subject matter of the present invention unnecessarily obscure are omitted.

Further, although the following description of embodiments of the present invention will be directed to mobile terminals such as a smartphone and a tablet that allow for data communication, it can be understood by those skilled in the art that the main gist of the present invention may also be applied to any other terminals in which similar technologies are implemented, with slight modifications, without substantially departing from the scope of the present invention.

Figure 1:
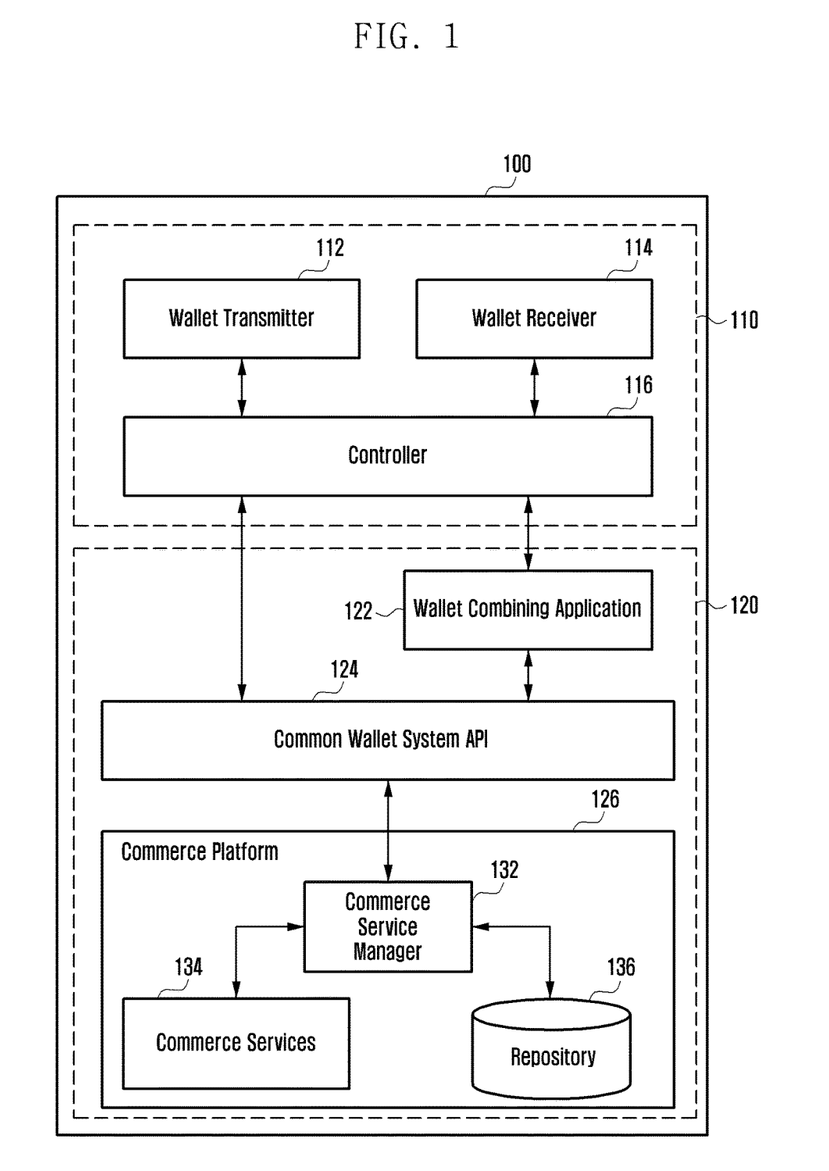
FIG. 1 is a view illustrating a configuration of a terminal performing a transmission and reception of wallet data according to an embodiment of the present invention.

FIG. 1 is a view illustrating a configuration of a terminal performing a transmission and reception of wallet data according to an embodiment of the present invention.

Referring to FIG. 1, the terminal 100 includes a wallet transmission and reception module 110 for transmitting wallet data to another terminal and receiving wallet data from another terminal. The wallet transmission and reception module 110 includes a wallet transmitter 112, a wallet receiver 114, and a controller 116.

The wallet transmitter 112 transmits the wallet data to another terminal under control of the controller 116, and the wallet receiver 114 receives the wallet data transmitted by another terminal. The data received in the wallet receiver 114 is transmitted to the controller 116. The controller 116 determines wallet data to be transmitted through the wallet transmitter 112, and otherwise, creates a message necessary for the transmission and reception of the wallet data.

The wallet transmitter 112 and the wallet receiver 114 communicate with each other using a predetermined transmission scheme. For example, the transmission scheme may include a transmission scheme through a mobile communication network, a transmission scheme through an Over The Air (OTA) network, a Wireless Fidelity (WiFi) scheme, a Near Field Communication (NFC) Peer to Peer (P2P) scheme, a Bluetooth scheme, or the like.

In addition, the terminal 100 further includes a wallet management module 120 which manages the wallet data and combines different kinds of wallet data. The wallet management module 120 includes a commerce platform 126 which manages the wallet data and provides various services related to the wallet data.

The commerce platform 126 is a platform which provides a service used by a wallet or a Point Of Sale (POS) in online and offline commercial transactions. In order to provide a service, the terminal 100 includes an embedded Secure Element (eSE) or a Universal Subscriber Identity Module (USIM) card, which functions as a security module, mounted thereon. The various services provided by the commerce platform 126 may be implemented in an applet form on the JAVA Operating System (OS) of a Secure Element (SE).

The commerce platform 126 includes a commerce service manager 132, and the commerce service manager 132 manages a list 134 of commercial transaction services which each wallet application uses. The list 134 of the commercial transaction services may be added, deleted, and updated by the commerce service manager 132

Further, the commerce service manager 132 stores service control information and service management information in a separate repository 136. Further, the commerce service manager 132 searches for and updates the service control information and the service management information in the separate repository 136. The service control information may be managed in the form of {service ID, allowed wallet application ID (hereinafter, referred to as application ID (AID))} as information of a wallet application which is allowed to use each commercial transaction service. Furthermore, the service management information may be managed in the form of {service ID, registered wallet application ID} as information of a wallet application which is registered to use each commercial transaction service.

The commerce service manager 132 directly stores and manages wallet data which are payment and non-payment information managed by each wallet application, or manages information on a directory in which the wallet data is stored. Moreover, regulation information of each wallet data is stored in a field of the wallet data or in the form of separate data.

The regulation information includes information on whether a combination of the wallet data is permitted, or information on a processing method in an existing wallet application in a case where the wallet data is combined with another wallet application. In the description, the method of processing the combined wallet data includes an update of some information, such as deletion of the wallet data from the existing wallet application, a counter in the existing wallet application, or the like.

An Application Program Interface (API) 124 for a common wallet system is used so as to allow the mobile terminal to access the commerce platform 126 and to acquire necessary information.

The API 124 for the common wallet system is a standardized interface to allow various applications of the terminal 100 to use various services provided by the commerce platform 126 of the terminal 100, and the controller 116 of the wallet transmission and reception module 110 calls the commerce platform 126 through the API 124 of the common wallet system and acquires information returned from the commerce platform 126. However, the controller 116 directly manages the wallet data even though the terminal 100 is not provided with the wallet management module 120.

Further, the API 124 of the common wallet system is used by the wallet applications installed in the terminal 100 and a wallet combining application 122 is used to combine the wallets. The wallet combining application 122 may be an application separately implemented to perform a function of a wallet combination, or one of the wallet applications may directly perform a function of a wallet combining application 122.

Furthermore, the API 124 of the common wallet system additionally includes a function of controlling access to the commerce platform 126 for the wallet application which has authorization to use a service provided by the commerce platform 126. In addition, the API 124 of the common wallet system includes functions as follows. However, the embodiment of the present invention is not limited thereto, and may be implemented in various forms in order to perform similar functions.

getServiceLists (AID) calls a list of services provided by the commerce platform 126. The commerce service manager 132 provides only a list of the services which are permitted for an ID of the wallet application which is requested through the service control information.

requestServiceRegister (AID, serviceID) is a wallet application that requests a registration for a specific service. The commerce service manager 132 permits the registration of the ID of the wallet application when it is determined through the service control information that the ID of the corresponding wallet application is permitted to use a requested service, and registers the ID of the wallet application in the service management information.

getServiceManagementInfo ( ) requests service provided by the commerce platform 126, and information of the wallet application registered to correspond to the service. This function may be used in the wallet combining application 122 or each wallet application for the combination of the wallets. The commerce service manager 132 identifies the service control information and provides the service management information only when access is permitted.

getWalletData ( ) is an application which combines wallets and requests wallet data of wallet applications to be combined. Alternatively, the controller 116 of the wallet transmission and reception module 110 requests wallet data to be transmitted to another terminal. The commerce service manager 132 provides the wallet data through the service control information only after the request is permitted.

getWalletDataPath ( ) is an application which combines wallets. Alternatively, the controller 116 of the wallet transmission and the reception module 110 requests information on a path for accessing the wallet data instead of the wallet data. The commerce service manager 132 provides a storing path of the wallet data through the service control information only after the request is permitted.

Hereinafter, an embodiment of the present invention in which the wallet data is received and managed in a receiving terminal will be described after explaining an embodiment of the present invention in which the transmitting terminal transmits the wallet data to the receiving terminal. Further, in the embodiment of the present invention, it is assumed that the wallet application corresponding to the wallet data to which the transmitting terminal transmits is not installed in the receiving terminal.

Figure 2:
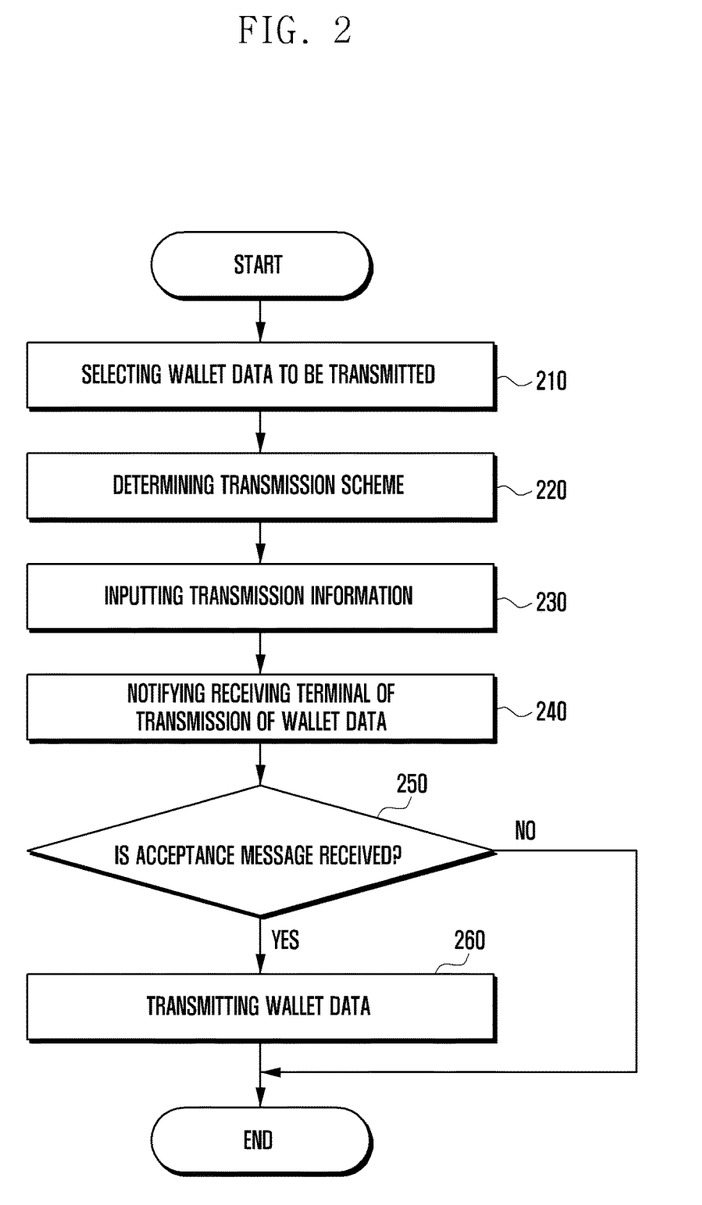
FIG. 2 is a flowchart illustrating a process of directly transmitting the wallet data by a transmitting terminal according to a first embodiment of the present invention.

FIG. 2 is a flowchart illustrating a process of directly transmitting the wallet data by a transmitting terminal according to a first embodiment of the present invention.

Referring to FIG. 2, the transmitting terminal selects the wallet data to be transmitted to the receiving terminal in step 210. As described above, the selection and transmission of the wallet data is performed by the wallet transmission and reception module mounted on the transmitting terminal. The wallet data managed by a plurality of wallet applications may be selected.

Next, the transmitting terminal determines a method of transmitting the wallet data to the receiving terminal in step 220. As an example of the transmitting method, an E-mail, a short message service, a multimedia message service, a Social Network Service (SNS), an NFC P2P mode provided through a connection between the terminals, a Bluetooth mode, and the like may be used.

In step 230, the transmitting terminal receives an input of transmission information necessary for the transmission data from the user. At least one of an E-mail address, a phone number of a receiving terminal, user information (ID and the like) of the receiving terminal, and/or an SNS ID may be included as information of the receiving terminal in the transmission information.

The transmitting terminal notifies the receiving terminal of the transmission of the wallet data based on the transmission information in step 240. Here, the wallet data may be transmitted along with the notification of the transmission of the wallet data, or only a notification message for notifying of the transmission is created and transmitted.

As described above, a communication scheme between the terminals, such as the OTA network scheme, the Wi-Fi scheme, the NFC P2P scheme, and the Bluetooth scheme and the like, may be used as the transmission scheme. Especially, in a case that the NFC P2P scheme and the Bluetooth scheme are used, a pairing channel is formed between the transmitting terminal and the receiving terminal, and then a transmission of the wallet data and other messages is started.

After the transmitting terminal receives an acceptance message from the receiving terminal in step 250, the wallet data is transmitted to the receiving terminal and the procedure is terminated. In a case that only the notification message is transmitted in step 240, the transmitting terminal transmits the wallet data in step 260. If the receiving terminal does not accept the notification of transmission of the wallet data via an acceptance message sent from the receiving terminal to the transmitting terminal in step 250, the wallet data is not transmitted to the receiving terminal and the procedure is terminated.

Figure 3:
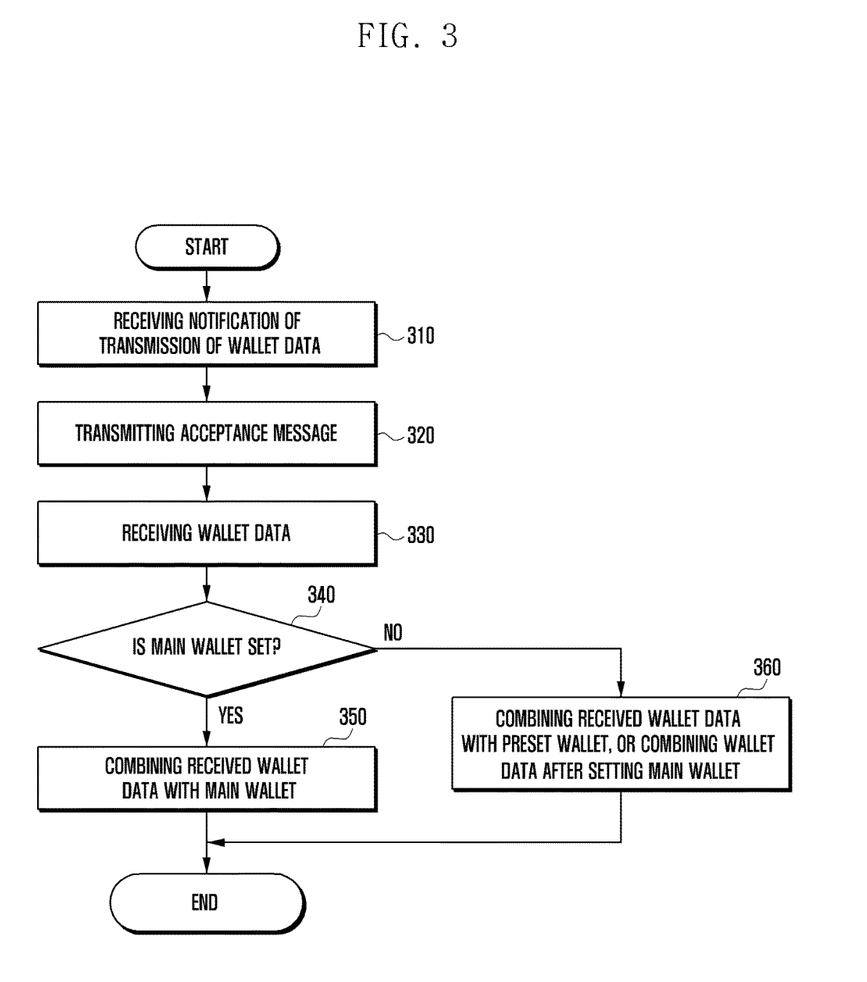
FIG. 3 is a flowchart illustrating an operation of a receiving terminal receiving the wallet data.

FIG. 3 is a flowchart illustrating an operation of a receiving terminal receiving the wallet data. The reception of the wallet data of the receiving terminal also may be performed by the wallet transmission and reception module mounted on the receiving unit.

In step 310, the receiving terminal receives a notification of the transmission of the wallet data from the transmitting terminal. The notification message may include the wallet data, and in addition, may include a transmission method of the wallet data.

The receiving terminal determines whether to receive the wallet data and, if so, transmits an acceptance message in step 320. After the acceptance message is transmitted, the receiving terminal receives the wallet data in step 330.

Here, there may be a problem if the wallet application corresponding to the received wallet data is not installed in the receiving terminal. Accordingly, the receiving terminal performs a process of combining the wallet data received in the wallet application installed in the receiving terminal so as to use the received wallet data.

The process of combining wallets may be performed by the controller of the wallet transmission and reception module, or by a separate wallet combining application or one of the existing wallet applications, to which the received wallet data is combined.

Therefore, the user of the receiving terminal can use the received wallet data through the existing wallet application without an installation of a new wallet application for the received wallet data.

On the other hand, a reference may be set for combining the plurality of the wallet applications. For example, one of the plural wallet applications may be set as a main wallet in step 340 and, if so, the received wallet data may be combined with the main wallet in step 350. The main wallet may be set in advance, or may be set by a selection of the user.

In a case that the main wallet is not set, the receiving terminal provides a User Interface (UI) so that the user can set the main wallet in step 360. Alternatively, in a case that the main wallet is not set, the wallet data is combined with a preset wallet application such as latest used wallet application in step 360.

In the wallet combining process of steps 350 and 360, the application performing the combination of the wallets may use the regulation information for the combination of the wallets as described above. The wallet data and the regulation information of the main wallet for the combination of the wallets may be acquired from the commerce platform in the terminal through the API of the common wallet system.

In this case, the regulation information may be not preset in the combination of the wallets. The application performing the combination of the wallets may determine whether the combination of the wallets is permitted or not permitted when there is no preset regulation information.

The combined wallet data is provided through the main wallet from the receiving terminal. Further, a message of a completion of a transmission may be transmitted from the receiving terminal to the transmitting terminal after the completion of the combination of the wallet data, and the transmitting terminal may delete, correct, or update the wallet data in the transmitting terminal according to the regulation information after it receives the message of the completion of the transmission.

The transmission of the wallet data described above may be performed by an external server instead of the transmitting terminal.

Figure 4:
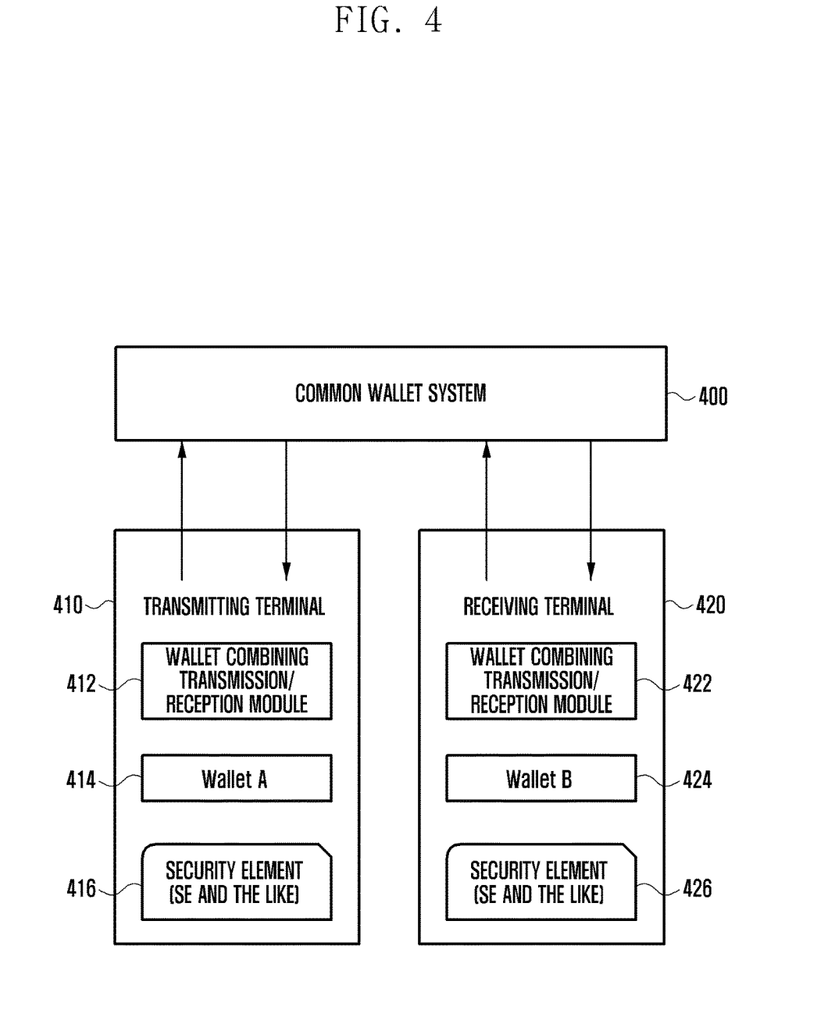
FIG. 4 is a block diagram illustrating a transmission of the wallet data performed by an external server in response to a request of the transmitting terminal according to a second embodiment of the present invention.

FIG. 4 is a block diagram illustrating a transmission of the wallet data performed by the external server in response to a request of the transmitting terminal according to the second embodiment of the present invention.

Referring to FIG. 4, both the transmitting terminal 410 and the receiving terminal 420 are connected to the external server through a wireless network, and the common wallet system 400 is installed in the connected server. Since the transmission process of the wallet data is performed external to the common wallet system 400, the common wallet system 400 supports a process of transmitting and receiving the wallet data to/from the plural terminals. Further, in a case of a credit card which is a payment means, the common wallet system 400 may be beneficially used to transmit wallet data requiring high security.

Further, the common wallet system 400 may support the wallet combining process instead of the receiving terminal. In this case, the receiving terminal receives and stores the wallet data combined by the common wallet system 400 after accepting the wallet data.

The transmitting terminal 410 and the receiving terminal 420 include the transmitting/receiving modules 412 and 422 for the transmission and reception, and the combination of the wallet data. The transmission and reception modules 412 and 422 for the combination of the wallets include the wallet data transmitting and receiving modules, and the wallet management module. A wallet A 414, which is a wallet application providing the wallet data to be transmitted, is installed in the transmitting terminal 410, and a wallet B 424, which is a wallet application to which a received wallet data is combined, is installed in the receiving terminal 420. Further, the transmitting terminal 410 and the receiving terminal 420 include security elements 416 and 426, such as SE and the like, for the security in all payment processes.

Figure 5:
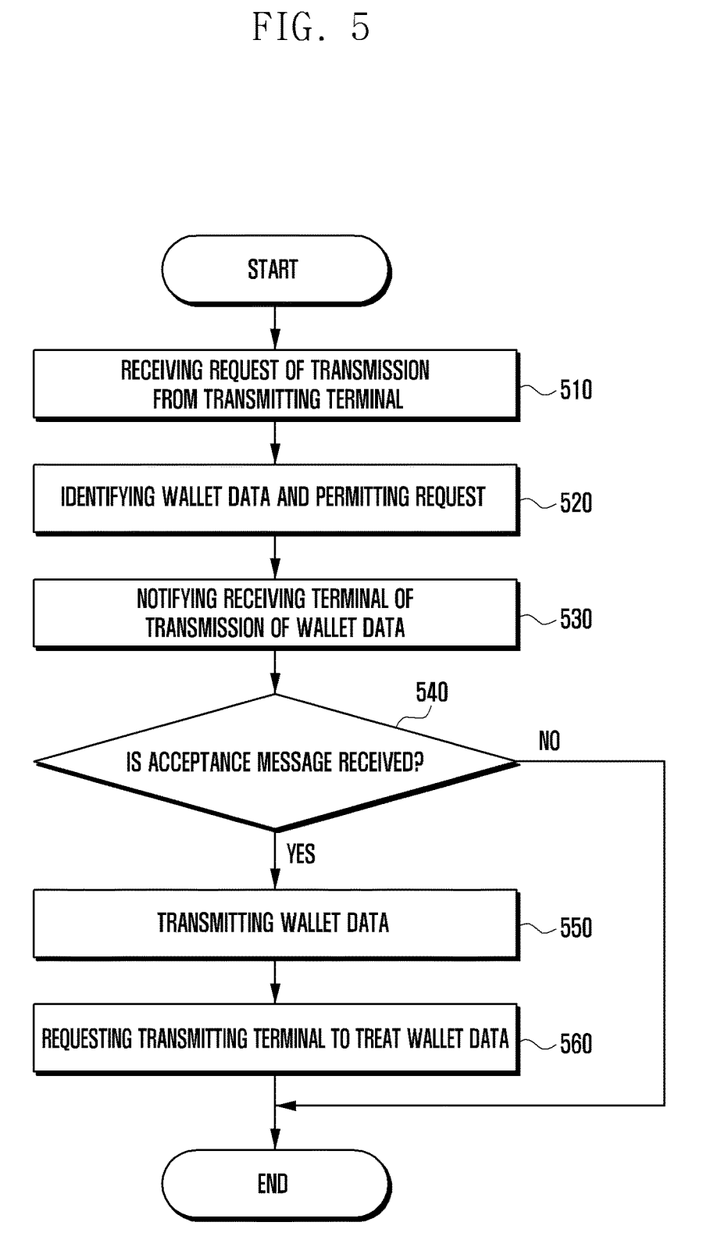
FIG. 5 is a flowchart illustrating a process of transmitting the wallet data by a common wallet system according to the second embodiment of the present invention.

FIG. 5 is a flowchart illustrating a process of transmitting the wallet data by a common wallet system 400 according to a second embodiment of the present invention.

Referring to FIG. 5, the common wallet system 400 receives a request to transmit the wallet data from the transmitting terminal 410 in step 510. The request of the transmission includes information on the transmitting terminal 410 and the receiving terminal 420, wallet data to be transmitted to the receiving terminal 420, a method of transmitting the wallet data, information on a user who transmits the wallet data, and the like. The transmitting terminal 410 receives an input of the wallet data transmitting method and information of the receiving terminal 420 from the user like in the first embodiment of the present invention.

The common wallet system 400 identifies the wallet data which the transmitting terminal 410 transmits and admits the request of the transmission. Then, the common wallet system 400 instead of the transmitting terminal 410 notifies the receiving terminal 420 of the transmission of the wallet data in step 530. In this case, the common wallet system 400 creates and transmits only a notification message to the receiving terminal 420.

After the common wallet system 400 receives an acceptance message from the receiving terminal 420 in step 540, it transmits the wallet data to the receiving terminal 420 in step 550. If the common wallet system 400 does not receive the acceptance message, the wallet data is not transmitted to the receiving terminal 420 and the procedure is terminated.

After the transmission of the wallet data to the receiving terminal 420 is completed, the common wallet system 400 requests the transmitting terminal 410 to process the wallet data in step 560. Particularly, the common wallet system 400 requests the transmitting terminal 410 to perform various treatments on the wallet data, such as deletion, correction, or update, based on regulation information of the transmitted wallet data. This process is performed as the common wallet system 400 receives a message of a transmission completion from the receiving terminal 420. Further, the processing of the wallet data in the transmitting terminal 410 may be immediately performed just after the common wallet system 400 permits the transmission of the wallet data.

The receiving terminal 420, which receives the wallet data from the common wallet system 400, combines the received wallet data to the wallet application thereof like in the first embodiment of the present invention. Alternatively, the common wallet system 400 receives necessary information for the wallet combination along with the message of acceptance of the transmission of the wallet data from the receiving terminal 420, and provides the combined data to the receiving terminal 420 after combining the wallet data.

Figure 6:
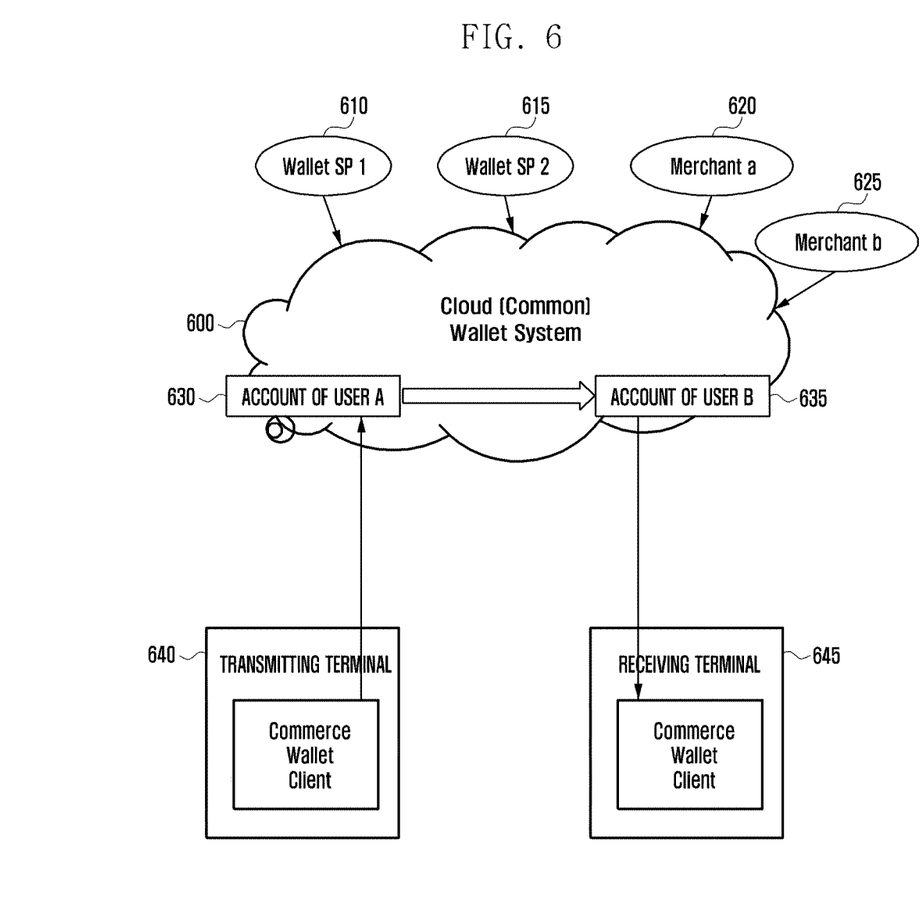
FIG. 6 is a view illustrating a configuration of a cloud system which provides a wallet transmitting and managing service according to a third embodiment of the present invention.

FIG. 6 is a view illustrating a configuration of a cloud system which provides a wallet transmitting and managing service according to a third embodiment of the present invention.

The cloud service is a server of a provider who provides a computing service, and allows software and data to be stored in a central computer connected to a network. Further, the cloud service allows the terminal to use the data anytime and anywhere if the terminal accesses the network.

Referring to FIG. 6, in the third embodiment of the present invention, the transmitting terminal 640 and the receiving terminal 645 manages the wallet data through the common wallet system in the cloud server 600 to which the transmitting terminal 640 and the receiving terminal 645 are connected through a wireless network, and a common wallet client is installed in the transmitting terminal 640 and the receiving terminal 645. Every wallet service provider 610 or 615, and the member stores 620 and 625 which subscribe to the wallet service, store data related to services which they provide, and provide the data to the transmitting terminal 640 and the receiving terminal 645.

When the member stores 620 and 625, which desire to use the wallet data provided by the wallet applications which are installed in the transmitting terminal 640 and the receiving terminal 645 respectively, request the transmitting terminal 640 and the receiving terminal 645 for the wallet data, the common wallet clients of the transmitting terminal 640 and the receiving terminal 645 to transmit necessary information to the cloud server 600 and request wallet data from the cloud server. The common wallet system of the cloud server 600 stores user account information 630 and 635 related to the users of the transmitting terminal 640 and receiving terminal 645 therein, and provides the wallet data to the transmitting terminal 640 and the receiving terminal 645 based on the user account information and the information transmitted by the transmitting terminal 640 and the receiving terminal 645. On the other hand, the common wallet client of the transmitting terminal 640 and the receiving terminal 645 provide a UI requesting authentication information in order to receive an input of user authentication information necessary for a request of the wallet data to the cloud server 600.

Since the wallet data is managed through the cloud server 600, it is possible to provide the wallet data and to safely transmit the wallet data between the terminals even though the security element SE is not installed in the transmitting terminal 640 or the receiving terminal 645.

In a case that the transmitting terminal 640 desires to transmit the wallet data to the receiving terminal 645 through the cloud server 600, the transmitting terminal 640 transmits a request of the transmission of the wallet data to the cloud server 600. That is, the cloud server 600 performs an operation identical to that which the common wallet system of the external server performs, like in the second embodiment of the present invention.

That is, after the common wallet system of the cloud server 600 receives the request of the transmission of the wallet data from the transmitting terminal 640, it identifies identification information of the wallet data included in the request of the transmission, identification information of the transmitting terminal 640, and/or identification information of the receiving terminal 645, and determines whether it is possible to transmit the wallet data. For the purpose, a Personal Identification Number (PIN) may be input by the user into the transmitting terminal 640.

If the transmitting terminal 640 is permitted to transmit the wallet data, the common wallet system of the cloud server 600 notifies the receiving terminal 645 of the transmission of the wallet data. After receiving an acceptance message from the receiving terminal 645, the common wallet system transmits information on the wallet data to the receiving terminal 645, instead of transmitting the wallet data.

The receiving terminal 645 updates the wallet data information which it has, after receiving the information on the wallet data. The user is notified of the transmission of the wallet data.

Those skilled in the art can appreciate that it is possible to implement the present invention in other specific forms without changing the technical idea or the indispensable characteristics of the present invention. Therefore, it should be understood that the above-described embodiments are illustrative and are not limiting under any possible interpretation. The scope of the present invention is defined by the appended claims to be described later, rather than the detailed description. Accordingly, it should be appreciated that all modifications or variations derived from the meaning and scope of the appended claims and their equivalents fall within the scope of the present invention.

Although embodiments of the present invention have been shown and described in the present invention and the drawings, they are used in a general sense in order to easily explain technical contents of the present invention, and to help comprehension of the present invention, and are not intended to limit the scope of the present invention. It is obvious to those skilled in the art to which the present invention pertains that other modified embodiments on the basis of the spirit of the present invention besides the embodiments disclosed herein can be carried out.

What is claimed is:

1. A method of transmitting data by a transmitting terminal which comprises a first wallet application used for a commercial transaction service, the method comprising:
   determining wallet data to be transmitted, and a method of
      a transmission of the wallet data, the wallet data comprising payment information and non-payment information provided by the first wallet application;
notifying a receiving terminal which does not include the first wallet application of the transmission of the wallet data;
transmitting the wallet data to the receiving terminal based on the method of the transmission if an acceptance message is received from the receiving terminal;
receiving a complete message from the receiving terminal if the transmitted wallet data is combined by the receiving terminal with a selected one of at least one wallet application installed in the receiving terminal which is different from the first wallet application; and
after receiving the complete message, updating information associated with the transmitted wallet data based on preset regulation information.

2. The method as claimed in claim 1, wherein the preset regulation information comprises at least one of:
information related to a treatment of updating the information of the wallet data if the completion message is received from the receiving terminal;
whether a combination of the wallet data is permitted with wallet data of a wallet application installed in the receiving terminal; and
information on a processing method in an existing wallet application installed in the receiving terminal, if the wallet data is combined with wallet data of the existing wallet application, and
wherein the wallet data and the preset regulation information are acquired from a commerce platform through a predetermined application program interface (API).

3. The method as claimed in claim 1, wherein the method of the transmission is selected from transmission using e-mail; transmission using a short message service; transmission using a multimedia message service; and transmission using a social network service (SNS).

4. The method as claimed in claim 1, wherein the method of the transmission comprises at least one of a transmission through a mobile communication network, a transmission through an Over To Air (OTA) network, a transmission through Wireless Fidelity (Wi-Fi), a transmission through a Near Field Communication (NFC) Peer to Peer (P2P), and a transmission through Bluetooth.

5. A method of transmitting data by a server, the method comprising:
receiving a request of a transmission of wallet data comprising payment information and non-payment information provided by a first wallet application from a transmitting terminal, the request comprising the wallet data and a method of the transmission of the wallet data;
determining whether the transmission of the wallet data is permitted based on the request of the transmission;
notifying a receiving terminal which does not include the first wallet application of the transmission of the wallet data if the transmission of the wallet data is permitted;
transmitting the wallet data to the receiving terminal based on the method of the transmission if an acceptance message is received from the receiving terminal;
receiving a complete message from the receiving terminal if the transmitted wallet data is combined by the receiving terminal with a selected one of at least one wallet application installed in the receiving terminal which is different from the first wallet application; and
after receiving the complete message, requesting the transmitting terminal to update information associated with the transmitted wallet data based on preset regulation information.

6. The method as claimed in claim 5, wherein the preset regulation information comprises at least one of:
information related to a treatment of updating the information of the wallet data if the completion message is received from the receiving terminal;
whether a combination of the wallet data is permitted with wallet data of a wallet application installed in the receiving terminal; and
information on a processing method in an existing wallet application installed in the receiving terminal, if the wallet data is combined with wallet data of the existing wallet application, and
wherein the wallet data and the preset regulation information are acquired from a commerce platform through a predetermined application program interface (API).

7. A method of receiving data by a receiving terminal which installs at least one wallet application used for a commercial transaction service, the method comprising:
receiving a notification of a transmission of wallet data comprising payment information and non-payment information provided by a first wallet application included in a transmitting terminal, wherein the first wallet application is different from the at least one wallet application;
transmitting an acceptance message corresponding to the notification of the transmission if a reception of the wallet data is permitted;
receiving the wallet data from the transmitting terminal;
combining the wallet data with a selected one of the at least one wallet application which is different from the first wallet application based on preset regulation information; and
transmitting a complete message to the transmitting terminal after combining the wallet data.

8. The method as claimed in claim 7, wherein the preset regulation information comprises at least one of:
information related to a treatment of updating the information of the wallet data if the completion message is received from the receiving terminal;
whether a combination of the wallet data is permitted with wallet data of a wallet application installed in the receiving terminal; and
information on a processing method in an existing wallet application installed in the receiving terminal, if the wallet data is combined with wallet data of the existing wallet application, and
wherein the wallet data and the preset regulation information are acquired from a commerce platform through a predetermined application program interface (API).

9. An apparatus for transmitting wallet data on a first wallet application used for a commercial transaction service, the apparatus comprising:
a transceiver configured to transmit and receive signals;
a wallet management unit is configured to comprise the first wallet application; and
at least one processor configured to:
determine wallet data to be transmitted and a method of a transmission of the wallet data, the wallet data comprising payment information and non-payment information provided by the first wallet application,
notify the transmission of the wallet data to a receiving terminal which does not include the first wallet application, transmit the wallet data to the receiving terminal based on the method of transmission if an acceptance message is received from the receiving terminal, receive a complete message from the receiving terminal if the transmitted wallet data is combined by the receiving terminal with a selected one of at least one wallet application installed in the receiving terminal which is different from the first wallet application, and after receiving the complete message, update information associated with the transmitted wallet data based on preset regulation information.

10. The apparatus as claimed in claim 9, wherein the preset regulation information comprises at least one of:

information related to a treatment of updating the information of the wallet data if the completion message is receiving from the receiving terminal;

whether a combination of the wallet data is permitted with wallet data of a wallet application installed in the receiving terminal; and information on a processing method in an existing wallet application installed in the receiving terminal, if the wallet data is combined with wallet data of the existing wallet application, wherein the wallet data and the preset regulation information are acquired from a commerce platform through a predetermined application program interface (API).

11. The apparatus as claimed in claim 9, wherein the method of the transmission is selected from transmission using e-mail; transmission using a short message service; transmission using a multimedia message service; and transmission using a social network service (SNS).

12. The apparatus as claimed in claim 9, wherein the method of the transmission of the wallet data comprises at least one of a transmission through a mobile communication network, a transmission through an Over To Air (OTA) network, a transmission through Wireless Fidelity (Wi-Fi), a transmission through a Near Field Communication (NFC) Peer to Peer (P2P), and a transmission through Bluetooth.

13. A server for transmitting wallet data, the server comprising:

a transceiver configured to transmit and receive signals; and at least one processor configured to:

receive a request of a transmission of wallet data comprising payment information and non-payment information provided by a first wallet application from a transmitting terminal, the request comprising the wallet data and a method of the transmission of the wallet data, determine whether a transmission of the wallet data is permitted based on the request of the transmission, notify a receiving terminal which does not include the first wallet application of the transmission of the wallet data if the transmission of the wallet data is permitted, transmit the wallet data to the receiving terminal based on the method of the transmission if an acceptance message is received from the receiving terminal, receive a complete message from the receiving terminal if the transmitted wallet data is combined by the receiving terminal with a selected one of at least one wallet application installed in the receiving terminal which is different from the first wallet application, and after receiving the complete message, request the transmitting terminal to update information associated with the transmitted wallet data based on preset regulation information.

14. The server as claimed in claim 13, wherein the preset regulation information comprises at least one of:

information related to a treatment of updating the information of the wallet data if the completion message is received from the receiving terminal;

whether a combination of the wallet data is permitted with wallet data of a wallet application installed in the receiving terminal; and information on a processing method in an existing wallet application installed in the receiving terminal, if the wallet data is combined with wallet data of the existing wallet application, and wherein the wallet data and the preset regulation information are acquired from a commerce platform through a predetermined application program interface (API).

15. An apparatus for receiving wallet data of a first wallet application used for a commercial transaction service, the apparatus comprising:

a transceiver configured to transmit and receive signals;

a wallet management unit configured to comprise at least one application which is different from the first wallet application included in a transmitting terminal; and at least one processor configured to:

receive a notification of a transmission of wallet data comprising payment information and non-payment information provided by the first wallet application, transmit an acceptance message corresponding to the notification of the transmission if a reception of the wallet data is permitted, receive the wallet data from the transmitting terminal;

control combining the wallet data with a selected one of the at least one wallet application based on preset regulation information which is different from the first wallet application; and transmit a complete message to the transmitting terminal after combining the wallet data.

16. The apparatus as claimed in claim 15, wherein the preset regulation information comprises at least one of:

information related to a treatment of updating the information of the wallet data if the completion message is received from a receiving terminal;

whether a combination of the wallet data is permitted with wallet data of a wallet application installed in the receiving terminal; and information on a processing method in an existing wallet application installed in the receiving terminal, if the wallet data is combined with wallet data of the existing wallet application, wherein the wallet data and the preset regulation information are acquired from a commerce platform through a predetermined application program interface (API).

* * * * *